United States Patent
Lee

(10) Patent No.: US 11,615,631 B2
(45) Date of Patent: Mar. 28, 2023

(54) APPARATUS AND METHOD FOR PROVIDING TOP VIEW IMAGE OF PARKING SPACE

(71) Applicants: HYUNDAI MOTOR COMPANY, Seoul (KR); KIA MOTORS CORPORATION, Seoul (KR)

(72) Inventor: Yong Joon Lee, Incheon (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 156 days.

(21) Appl. No.: 16/876,952

(22) Filed: May 18, 2020

(65) Prior Publication Data
US 2021/0073560 A1 Mar. 11, 2021

(30) Foreign Application Priority Data
Sep. 10, 2019 (KR) .................. 10-2019-0112296

(51) Int. Cl.
*G06V 20/58* (2022.01)
*G08G 1/14* (2006.01)
(Continued)

(52) U.S. Cl.
CPC ............ *G06V 20/586* (2022.01); *B60K 35/00* (2013.01); *B60R 11/04* (2013.01); *B62D 15/021* (2013.01);
(Continued)

(58) Field of Classification Search
CPC ...... G06V 20/586; G06V 10/25; B60K 35/00; B60K 2370/166; B60K 2370/178; B60K 2370/1868; B60K 2370/152; B60K 2370/171; B60K 2370/176; B60K 2370/21; B60K 37/06; B60R 11/04; B60R 2300/607; B60R 2300/806; B60R 1/00; B60R 2300/00; B62D 15/021; B62D 1/00; B62D 15/0285; G08G 1/143; G08G 1/168;
(Continued)

(56) References Cited

U.S. PATENT DOCUMENTS 5,414,625 A * 5/1995 Hattori ................ G05D 1/0274
701/28
2010/0321211 A1* 12/2010 Ko ........................ G08G 1/163
345/173
(Continued)

FOREIGN PATENT DOCUMENTS

KR 10-2020-0129292 A 11/2020

*Primary Examiner* — James M Pontius
(74) *Attorney, Agent, or Firm* — Morgan, Lewis & Bockius LLP

(57) ABSTRACT

An apparatus and method for providing a top view image of a parking space are provided. The apparatus includes a steering angle sensor that measures a steering angle of a vehicle, a top view image generator that generates a top view image of a parking space depending on travel of the vehicle, a display that displays the top view image generated by the top view image generator, and a controller that captures the top view image displayed by the display and generates a panorama top view image by connecting the current top view image generated by the top view image generator and the captured previous top view image, based on the steering angle measured by the steering angle sensor.

12 Claims, 14 Drawing Sheets

(51) Int. Cl.
*B62D 15/02* (2006.01)
*B60K 35/00* (2006.01)
*B60R 11/04* (2006.01)

(52) U.S. Cl.
CPC ........ *G08G 1/143* (2013.01); *B60K 2370/166* (2019.05); *B60K 2370/178* (2019.05); *B60K 2370/1868* (2019.05); *B60R 2300/607* (2013.01); *B60R 2300/806* (2013.01)

(58) Field of Classification Search
CPC . G08G 1/137; G06T 3/00; B60W 2050/0001; B60W 50/14; B60W 10/20; B60W 40/02; B60W 2050/146; B60W 2540/18
See application file for complete search history.

(56) References Cited

U.S. PATENT DOCUMENTS

| | | | |
|---|---|---|---|
| 2016/0110619 A1* | 4/2016 | Kim | B60R 11/04 382/104 |
| 2017/0355307 A1* | 12/2017 | Ha | G08G 1/143 |
| 2017/0372615 A1* | 12/2017 | Choi | B60R 1/00 |
| 2020/0226926 A1* | 7/2020 | Suzuki | B62D 15/0285 |
| 2020/0307616 A1* | 10/2020 | Nithiyanantham | G02B 27/0101 |
| 2020/0334474 A1* | 10/2020 | Kaneko | G06T 7/62 |
| 2020/0357145 A1* | 11/2020 | Lee | G06V 20/586 |
| 2020/0369204 A1* | 11/2020 | Suzuki | G08G 1/056 |
| 2021/0118299 A1* | 4/2021 | Yata | G08G 1/141 |

* cited by examiner

APPARATUS AND METHOD FOR PROVIDING TOP VIEW IMAGE OF PARKING SPACE

CROSS-REFERENCE TO RELATED APPLICATION

The present application claims priority to and the benefit of Korean Patent Application No. 10-2019-0112296, filed on Sep. 10, 2019, which is incorporated herein by reference in its entirety.

TECHNICAL FIELD

The present disclosure relates to a technology for providing a top view image of a parking space found by a parking assistance system of a vehicle.

BACKGROUND

The statements in this section merely provide background information related to the present disclosure and may not constitute prior art.

In general, an apparatus for providing a top view image of a parking space operates in conjunction with a parking assistance system of a vehicle to display a top view image of a certain limited area (e.g., an area within a distance of 3 m to 4 m from the host vehicle) as illustrated in FIG. 1. At this time, as the vehicle slowly moves forward, an image of a parking space taken by a plurality of cameras is changed, and the top view image is also changed correspondingly.

The apparatus for providing the top view image of the parking space displays an icon 11 in an empty parking place on the currently displayed top view image to inform a user that the user can park in the empty parking place, and because the apparatus cannot directly display, in empty parking places not included in the current top view image (the empty parking places included in the previous top view image), icons for informing the user that the user can park in the empty parking places, the apparatus displays icons 12 in directions toward the empty parking places to inform the user that the empty parking places are present.

The apparatus for providing the top view image of the parking space provides only a top view image of a parking space at the present time and fails to provide a top view image of a parking space at the previous time, and therefore a user cannot select an empty parking place on the previous top view image.

SUMMARY

An aspect of the present disclosure provides an apparatus and method for providing a top view image of a parking space, in which the apparatus and method captures a top view image of a parking space on a path along which a vehicle travels, and provides a panorama top view image by connecting the current top view image and the previous top view image based on a steering angle depending on the travel of the vehicle, thereby enabling a user to freely select not only an empty parking place on the current top view image but also an empty parking place on the previous top view image.

The technical problems to be solved by the present disclosure are not limited to the aforementioned problems, and any other technical problems not mentioned herein will be clearly understood from the following description by those skilled in the art to which the present disclosure pertains. Also, it will be easily understood that the aspects and advantages of the present disclosure can be accomplished by the means set forth in the appended claims and combinations thereof.

According to an aspect of the present disclosure, an apparatus for providing a top view image of a parking space includes a steering angle sensor that measures a steering angle of a vehicle, a top view image generator that generates a top view image of a parking space depending on travel of the vehicle, a display that displays the top view image generated by the top view image generator, and a controller that captures the top view image displayed by the display and generates a panorama top view image by connecting the current top view image generated by the top view image generator and the captured previous top view image, based on the steering angle measured by the steering angle sensor.

The controller may apply shading to the captured top view image of the panorama top view image. The controller may divide the captured top view image into a plurality of areas and may differently shade the plurality of areas.

The controller may control the display to display the generated panorama top view image.

The apparatus may further include a motion detection sensor that detects a movement around an empty parking place, and the controller may control the display to additionally display a warning icon at a position on the panorama top view image that corresponds to the empty parking place around which the movement is detected by the motion detection sensor.

The controller may store the captured top view image in storage. The controller may delete the top view image stored in the storage when a lifetime of the top view image stored in the storage exceeds critical time.

According to another aspect of the present disclosure, a method for providing a top view image of a parking space includes measuring a steering angle depending on travel of a vehicle, generating a top view image of a parking space depending on the travel of the vehicle, displaying the generated top view image, capturing the displayed top view image, and generating a panorama top view image by connecting the generated current top view image and the captured previous top view image, based on the measured steering angle.

The generating of the panorama top view image may include applying shading to the captured top view image of the panorama top view image. The applying of the shading may include dividing the captured top view image into a plurality of areas and differently shading the plurality of areas.

The method may further include displaying the generated panorama top view image, detecting a movement around an empty parking place, and displaying a warning icon at a position on the panorama top view image that corresponds to the empty parking place around which the movement is detected.

The method may further include storing the captured top view image and deleting the stored top view image when a lifetime of the stored top view image exceeds critical time.

Further areas of applicability will become apparent form the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
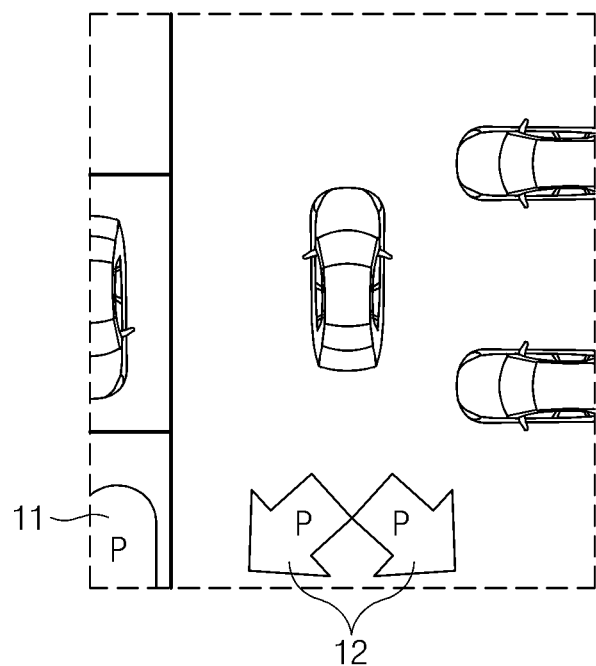
FIG. 1 is an exemplary view illustrating a general top view image of a parking space.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing some forms of the present disclosure, a detailed description of well-known features or functions will be ruled out in order not to unnecessarily obscure the gist of the present disclosure.

In describing some forms of the present disclosure, terms such as first, second, "A", "B", (a), (b), and the like may be used. These terms are merely intended to distinguish one component from another component, and the terms do not limit the nature, sequence or order of the components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
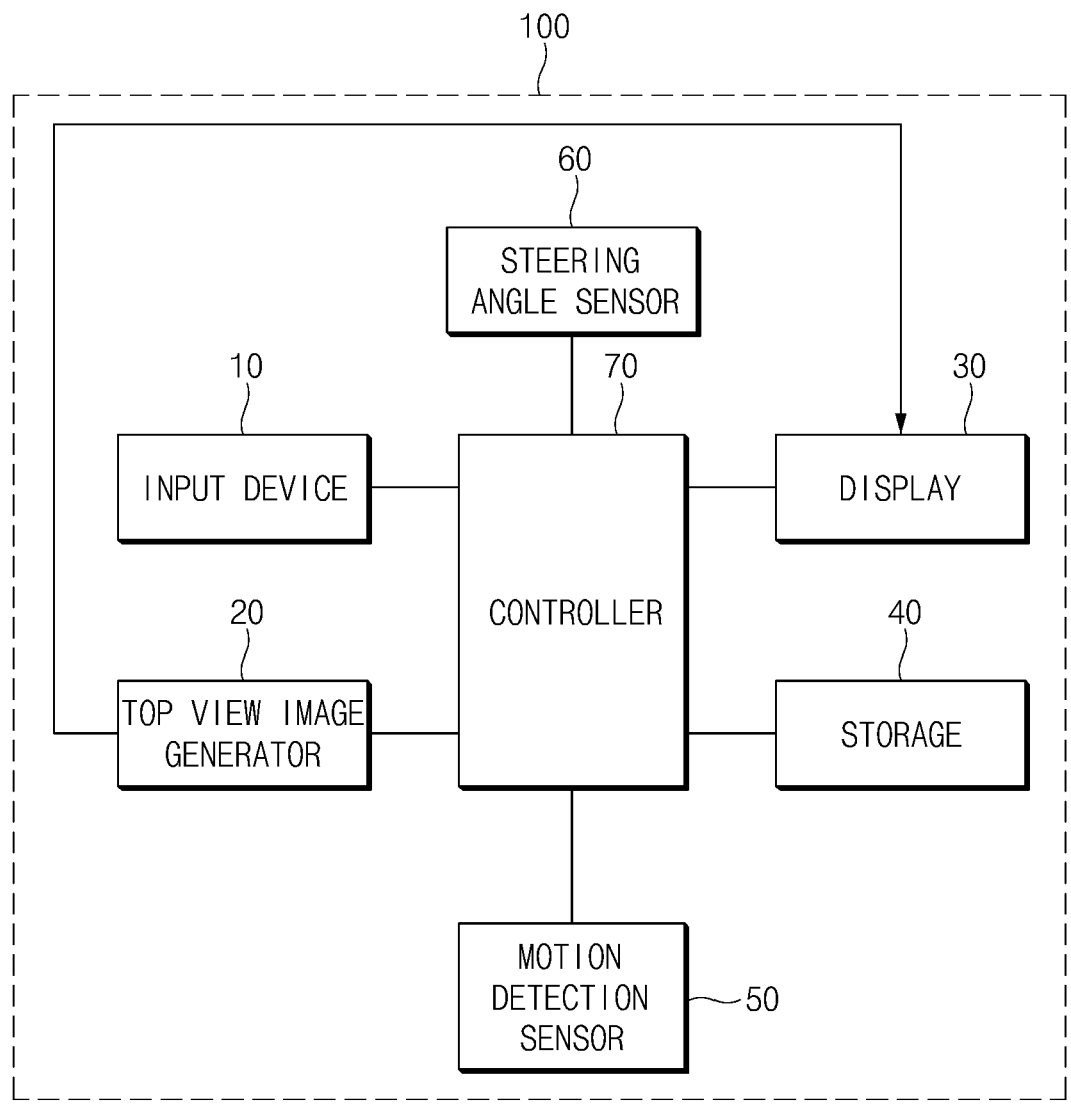
FIG. 2 is a view illustrating a configuration of an apparatus for providing a top view image of a parking space in one form of the present disclosure.

FIG. 2 is a view illustrating a configuration of an apparatus for providing a top view image of a parking space in some forms of the present disclosure.

As illustrated in FIG. 2, the apparatus 100 for providing the top view image of the parking space in some forms of the present disclosure may include an input device 10, a top view image generator 20, a display 30, storage 40, a motion detection sensor 50, a steering angle sensor 60, and a controller 70. The components may be combined together to form one entity, or some of the components may be omitted, depending on a way of carrying out the apparatus 100 for providing the top view image of the parking space in some forms of the present disclosure.

The components will be described below in detail. The input device 10 may receive, from a user, an input of a command to display a top view image of the current parking space or an input of a command to display a panorama top view image.

The input device 10 may receive the user's request in various ways such as a touch on a screen, a button input, and the like. The input device 10 may receive a swipe for moving the screen, as the touch on the screen.

The top view image generator 20 may be equipped in a vehicle and may generate a top view image of a parking space using a two-dimensional image of the parking space that is taken by a plurality of cameras. Hereinafter, a detailed configuration of the top view image generator 20 will be described with reference to FIG. 3. However, the top view image generator 20 is not necessarily limited thereto.

Figure 3:
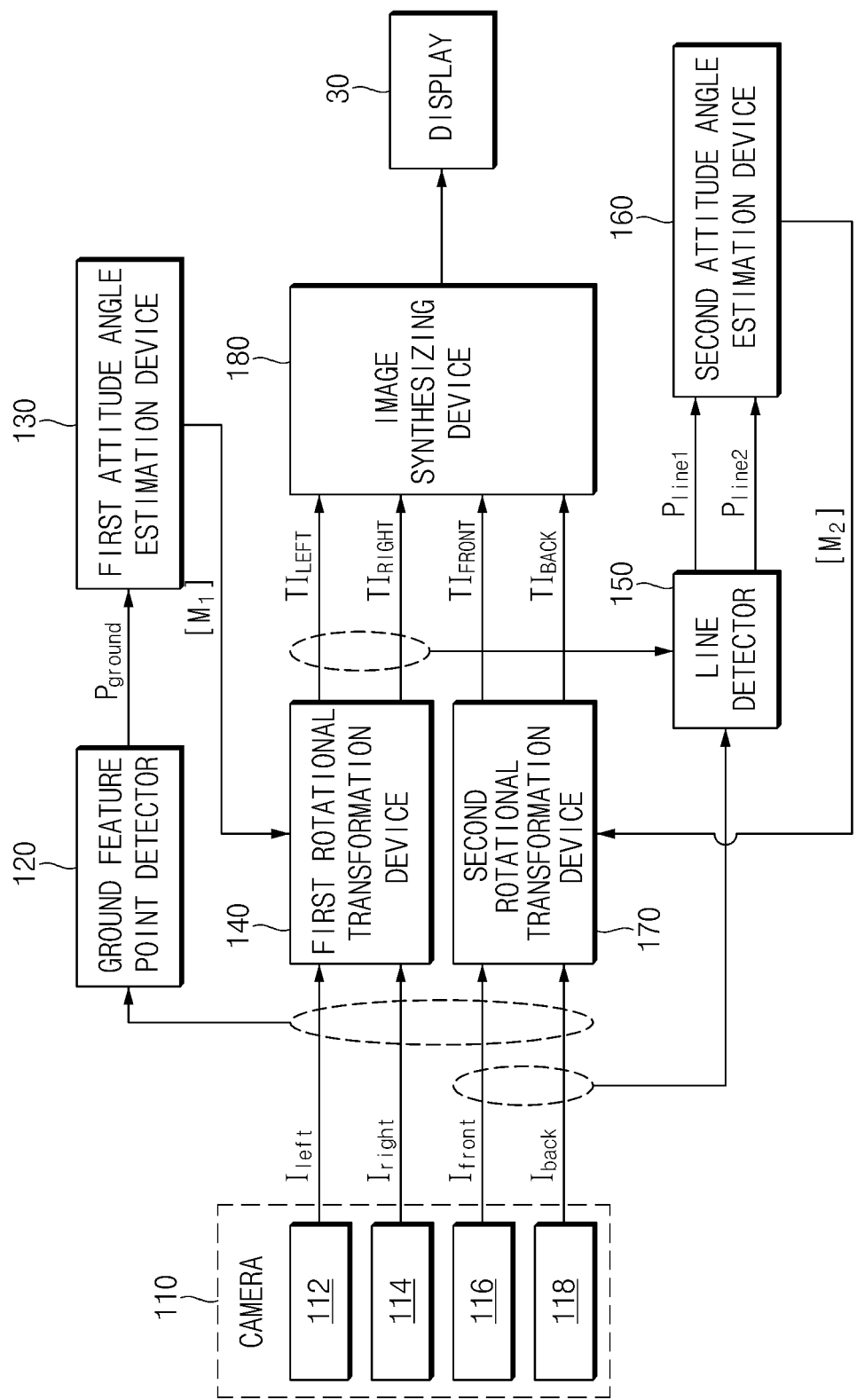
FIG. 3 is a view illustrating a detailed configuration of a top view image generator included in the apparatus for providing the top view image of the parking space in one form of the present disclosure.

FIG. 3 is a view illustrating a detailed configuration of the top view image generator included in the apparatus for providing the top view image of the parking space in some forms of the present disclosure.

As illustrated in FIG. 3, the top view image generator 20 included in the apparatus 100 for providing the top view image of the parking space in some forms of the present disclosure may include a camera 110, a ground feature point detector 120, a first attitude angle estimation device 130, a first rotational transformation device 140, a line detector 150, a second attitude angle estimation device 160, a second rotational transformation device 170, and an image synthesizing device 180.

The camera 110 includes a left camera 112 attached to a lower end of a left side mirror of the vehicle, a right camera 114 attached to a lower end of a right side mirror of the vehicle, a front camera 116 attached to the front of the vehicle, and a rear camera 118 attached to the rear of the vehicle.

The left camera 112 takes an image of the ground on a left side of the vehicle and generates a left image $I_{left}$ on a frame-by-frame basis, and the right camera 14 takes an image of the ground on a right side of the vehicle and generates a right image $I_{right}$ on a frame-by-frame basis.

The front camera 116 takes an image of the ground ahead of the vehicle and generates a front image $I_{front}$ on a frame-by-frame basis, and the rear camera 118 takes an image of the ground behind the vehicle and generates a rear image $I_{back}$ on a frame-by-frame basis.

The ground feature point detector 120 detects a ground feature point $P_{ground}$ and a translation vector of the ground feature point $P_{ground}$ on a frame-by-frame basis from at least one image from which the ground feature point $P_{ground}$ is detectable, among the left image $I_{left}$ provided from the left camera 112, the right image $I_{right}$ provided from the right camera 114, the front image $I_{front}$ provided from the front camera 116, and the rear image $I_{back}$ provided from the rear camera 118. Here, the image from which the ground feature point $P_{ground}$ is detectable may include the left image or the right image.

An optical flow based feature point extraction algorithm, such as the block matching method, the Horn-Schunck algorithm, the Lucas-Kanade algorithm, the Gunnar Farneback's algorithm, or the like, may be used as a method for detecting the ground feature point $P_{ground}$ and the translation vector of the ground feature point $P_{ground}$ from the left image or the right image. The algorithms are well-known technologies, and therefore detailed descriptions thereabout will be omitted.

The first attitude angle estimation device 130 estimates first attitude angles of the left camera 112 and the right camera 114, based on the ground feature point $P_{ground}$ and the translation vector of the ground feature point $P_{ground}$ that are input from the ground feature point detector 120, and generates a transformation matrix $[M_1]$ that represents the estimated first attitude angles in a matrix form.

The first rotational transformation device 140 generates a first top view image by performing rotational transformation of the left image $I_{left}$ and the right image $I_{right}$, based on the transformation matrix $[M_1]$ that is input from the first attitude angle estimation device 130. Here, the first top view image includes a left top view image $TI_{LEFT}$ obtained by performing rotational transformation of the left image $I_{left}$ using the transformation matrix $[M_1]$ and a right top view image $TI_{right}$ obtained by performing rotational transformation of the right image $I_{right}$ using the transformation matrix $[M_1]$.

The line detector 150 detects a first parking line $P_{line1}$ from the left top view image $TI_{LEFT}$ and the right top view image $TI_{RIGHT}$ that are input from the first rotational transformation device 140. Here, the first parking line $P_{line1}$ includes a left parking line detected from the left top view image $TI_{LEFT}$ and a right parking line detected from the right top view image $TI_{RIGHT}$.

A line detection algorithm may be used as a method for detecting the left parking line and the right parking line from the left top view image $TI_{LEFT}$ and the right top view image $TI_{RIGHT}$. However, the present disclosure is not characterized by the line detection algorithm, and therefore detailed description thereabout will be omitted. Furthermore, a technology for obtaining not only a line but also line-related information, such as the thickness and direction of the line, through the line detection algorithm is well known, and therefore detailed description thereabout will be omitted.

The line detector 150 detects a second parking line $P_{line2}$, which is connected to the first parking line $P_{line1}$, from the front image $I_{front}$ and the rear image $I_{back}$ that are input from the camera 110. Here, the second parking line $P_{line2}$ includes an upper parking line detected from the front image $I_{front}$ and a lower parking line detected from the rear image $I_{back}$.

The second attitude angle estimation device 160 estimates second attitude angles of the front camera 116 and the rear camera 118, based on a correspondence relation between a feature pattern of the first parking line $P_{line1}$ and a feature pattern of the second parking line $P_{line2}$ that are input from the line detector 150, and generates a transformation matrix $[M_2]$ that represents the estimated second attitude angles in a matrix form.

The second rotational transformation device 170 generates a second top view image by performing rotational transformation of the front image $I_{front}$ and the rear image $I_{back}$ using the transformation matrix $[M_2]$ that is input from the second attitude angle estimation device 160. Here, the second top view image includes a front top view image $TI_{FRONT}$ obtained by performing rotational transformation of the front image $I_{front}$ using the transformation matrix $[M_2]$ and a rear top view image $TI_{BACK}$ obtained by performing rotational transformation of the rear image $I_{back}$ using the transformation matrix $[M_2]$.

The image synthesizing device 180 generates the final top view image by synthesizing the first top view image $TI_{LEFT}$ and $TI_{RIGHT}$ input from the first rotational transformation device 140 and the second top view image $TI_{FRONT}$ and $TI_{BACK}$ input from the second rotational transformation device 170.

The above-described configuration of the top view image generator 20 is merely illustrative, and the present disclosure is not characterized by the technology for generating the top view image. Accordingly, any well-known technology may be used.

The display 30 displays a top view image of a parking space that is generated by the top view image generator 20. At this time, the top view image of the parking space may further include a warning icon.

The display 30 may display a panorama top view image in which the current top view image and the previous top view image of a parking space are connected.

The display 30 may include at least one of a liquid crystal display (LCD), a thin film transistor-liquid crystal display (TFF LCD), an organic light-emitting diode (OLED) display, a flexible display, a three-dimensional (3D) display, and/or an e-ink display.

The storage 40 may store various types of logic, algorithms, and programs that are required in a process of capturing a top view image of a parking space on a path along which the vehicle travels and providing a panorama top view image in which the current top view image and the previous top view image are connected, based on a steering angle depending on the travel of the vehicle.

The storage 40 may store a top view image of a parking space that is captured by the controller 70.

The storage 40 may include at least one type of storage medium among memories of a flash memory type, a hard disk type, a micro type, and a card type (e.g., a secure digital (SD) card or an eXtream digital (XD) card) and memories of a random access memory (RAM) type, a static RAM (SRAM) type, a read-only memory (ROM) type, a programmable ROM (PROM) type, an electrically erasable PROM (EEPROM) type, a magnetic RAM (MRAM) type, a magnetic disk type, and an optical disk type.

The motion detection sensor 50 is mounted on the rear, right, or left side of the vehicle and detects a movement around an empty parking place. That is, the motion detection sensor 50 may detect a vehicle approaching the empty parking place and may detect a vehicle leaving the parking place.

The motion detection sensor 50 may include at least one of an ultrasonic sensor, a rear camera, and/or radar.

The steering angle sensor 60 measures a steering angle depending on travel of the vehicle.

The controller 70 performs overall control to enable the components to normally perform functions thereof. The controller 70 may be implemented in a hardware or software form, or may be implemented in a form in which hardware and software are combined. The controller 70 may preferably be implemented with, but is not limited to, a microprocessor.

The controller 70 may capture a top view image of a parking space on a path along which the vehicle travels and may provide a panorama top view image in which the current top view image and the previous top view image are connected, based on a steering angle depending on the travel of the vehicle. At this time, the controller 70 may operate in conjunction with the parking assistance system of the vehicle to capture the top view image of the parking space on the path along which the vehicle travels.

The controller 70 may control the display 30 to display a top view image of a parking space that is generated by the top view image generator 20. The top view image displayed by the display 30 is a real-time image as illustrated in FIG. 1.

The controller 70 may capture the top view image of the parking space that is displayed by the display 30 and may store the captured image in the storage 40. When the lifetime of the top view image stored in the storage 40 exceeds critical time (e.g., five minutes, ten minutes, or the like) or the vehicle moves a critical distance (e.g., 30 m or 50 m), the controller 70 may determine that there is no validity and may delete the top view image stored in the storage 40. That is, the controller 70 may delete top view images that have been stored for the critical time or more among top view images stored in the storage 40.

Figure 4:
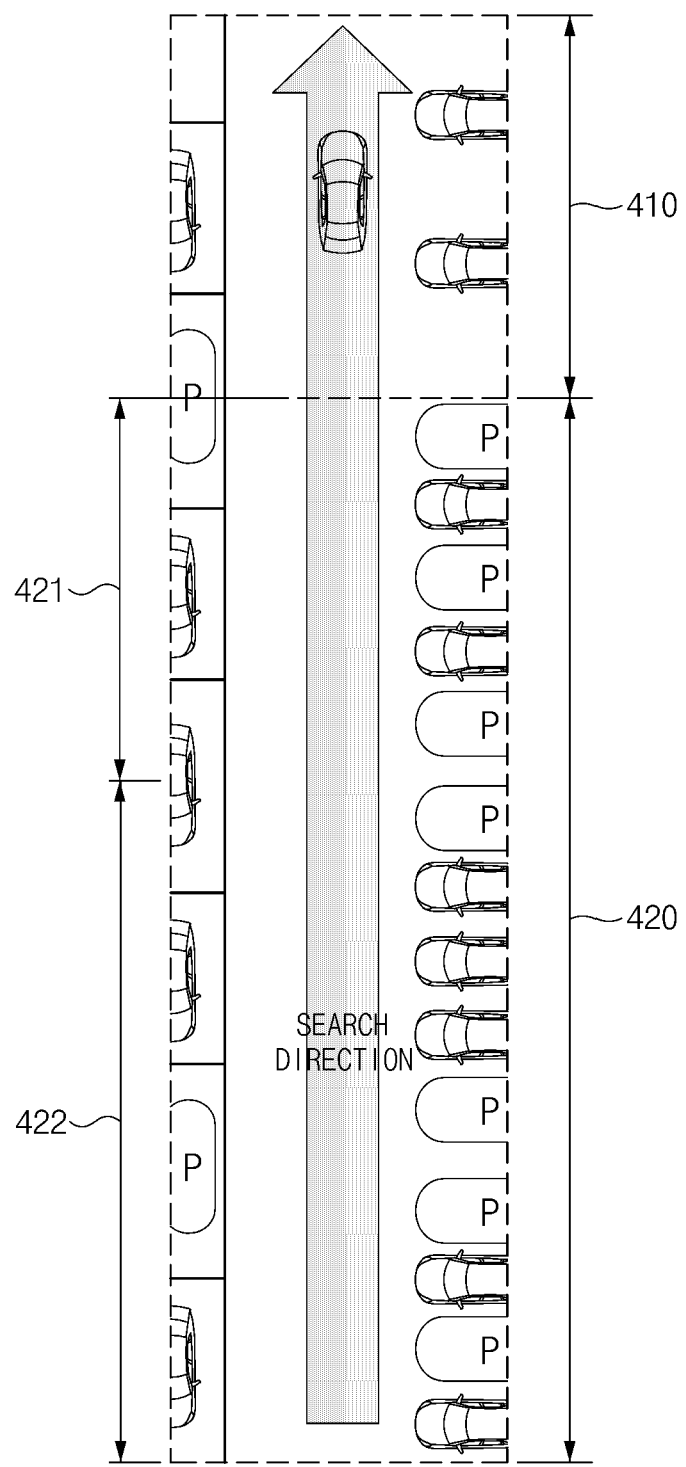
FIG. 4 is an exemplary view illustrating a panorama top view image generated by the apparatus for providing the top view image of the parking space in one form of the present disclosure.

The controller 70 may generate a panorama top view image as illustrated in FIG. 4, by sequentially connecting previous top view images stored in the storage 40, based on the current top view image generated in real time by the top view image generator 20.

FIG. 4 is an exemplary view illustrating a panorama top view image generated by the apparatus for providing the top view image of the parking space in some forms of the present disclosure.

In FIG. 4, reference numeral 410 denotes a top view image of a parking space that is provided in real time from the top view image generator 20, and reference numeral 420 denotes the previous top view image captured by the controller 70. Reference numeral 420 represents a state in which a plurality of top view images captured are connected.

The controller 70 may shade the captured previous top view image to increase visibility. For example, the controller 70 may apply 20% shading to an area 421 as a first step and may apply 50% shading to an area 422 as a second step. The number of areas to which shading is applied and the percentage of the shading may be varied depending on a designer's intention. The controller 70 may display the shaded panorama top view image on the navigation map.

Hereinafter, a process in which the controller 70 generates (synthesizes) a panorama top view image will be described in detail with reference to FIGS. 5A and 5B.

Figure 5A:
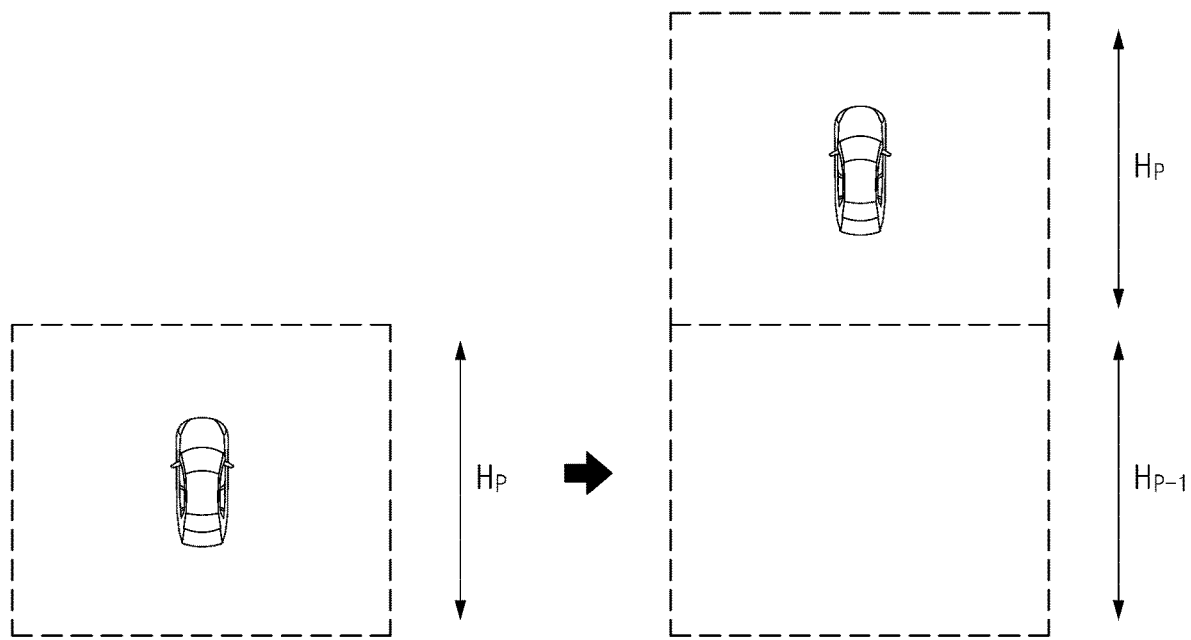
FIGS. 5A and 5B are exemplary views illustrating a process of generating a panorama top view image by the apparatus for providing the top view image of the parking space ain one form of the present disclosure.
Figure 5B:
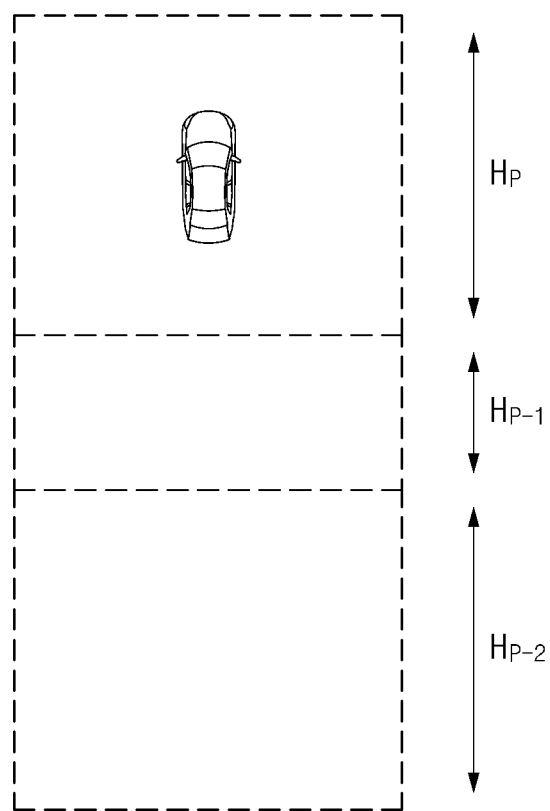

FIGS. 5A and 5B are exemplary views illustrating a process of generating a panorama top view image by the apparatus for providing the top view image of the parking space in some forms of the present disclosure.

In FIG. 5A, $H_p$ denotes the current top view image, and $H_{p-1}$ denotes the previous top view image. The sizes of the top view images are the same as the size of a screen of the display 30.

The controller 70 may generate a panorama top view image by connecting the previous top view image $H_{p-1}$ to the current top view image $H_p$.

However, although the next top view image $H_{p-1}$ is generated after the first top view image $H_{p-2}$, the current top view image $H_p$ may overlap the previous top view image $H_{p-1}$ as illustrated in FIG. 5B. The first top view image $H_{p-2}$ and the next top view image $H_{p-1}$ are captured images, and the current top view image $H_p$ is an image provided in real time.

In this case, because the current top view image $H_p$ is a base, a panorama top view image is generated by cutting a portion of the previous top view image $H_{p-1}$ that overlaps the current top view image $H_p$ and sequentially connecting the remaining top view image $H_{p-1}$ and the first top view image $H_{p-2}$ to the current top view image $H_p$.

The controller 70 may adjust the length of the panorama top view image. That is, the controller 70 may adjust the size of the panorama top view image displayed on the display 30.

Figure 6:
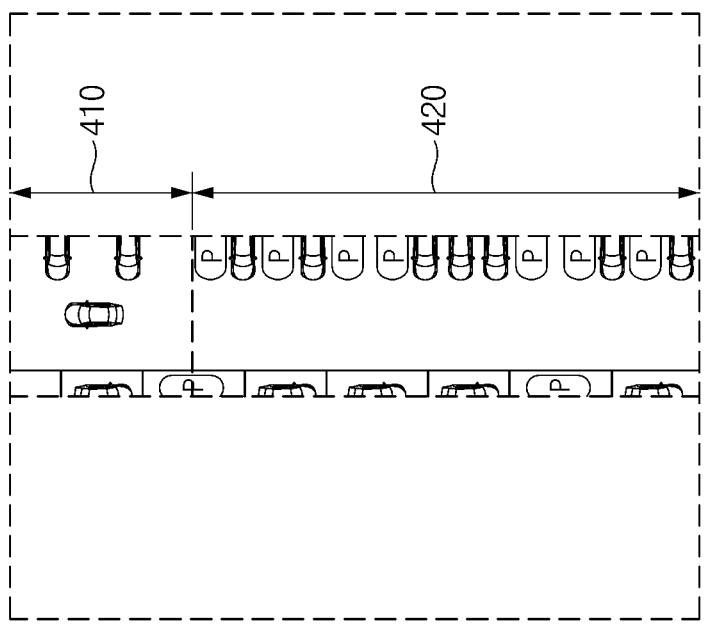
FIG. 6 is a view illustrating a state in which a display of the apparatus for providing the top view image of the parking space displays a panorama top view image in one form of the present disclosure.
Figure 6:
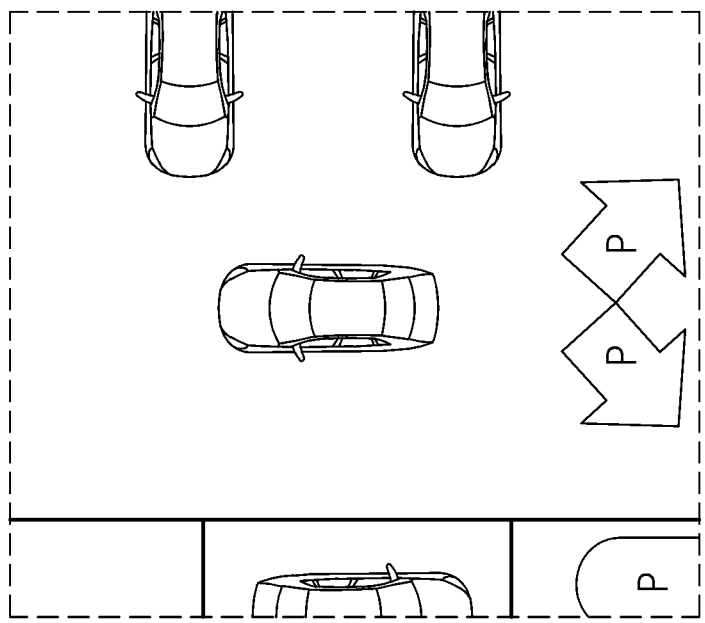

The controller 70 may control the display 30 to display the panorama top view image as illustrated in FIG. 6.

FIG. 6 is a view illustrating a state in which the display of the apparatus for providing the top view image of the parking space displays a panorama top view image in some forms of the present disclosure.

As illustrated in FIG. 6, the display 30 displays directions of available parking spaces with arrows on a top view image of a partial parking space to inform a driver of empty parking places that are not displayed, but the display 30 does not display the arrows on a panorama top view image because the empty parking places are displayed on the panorama top view image.

Meanwhile, the controller 70 may additionally generate position information of an empty parking place on a top view image generated by the top view image generator 20.

Figure 7:
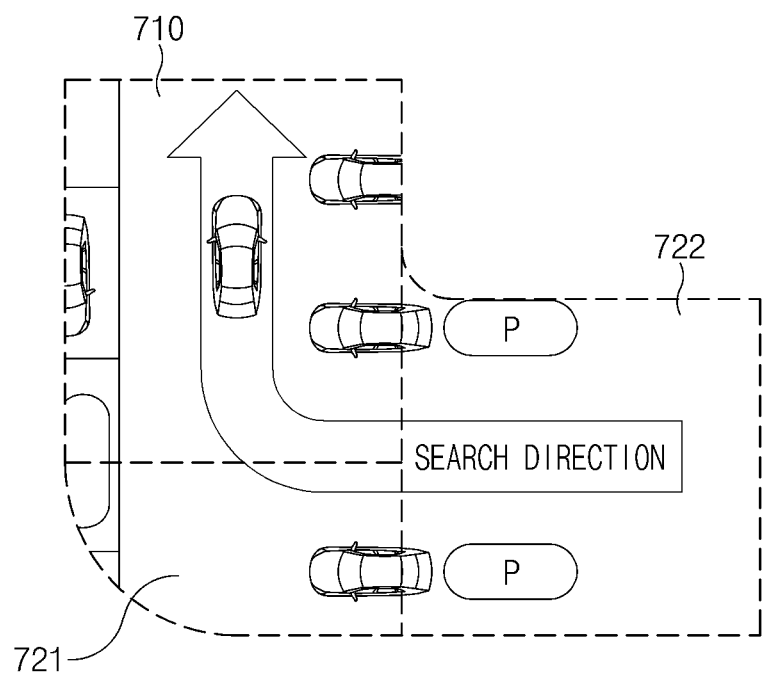
FIG. 7 is a view illustrating another example of a panorama top view image generated by the apparatus for providing the top view image of the parking space in one form of the present disclosure.

FIG. 7 is a view illustrating another example of a panorama top view image generated by the apparatus for providing the top view image of the parking space in some forms of the present disclosure.

As illustrated in FIG. 7, the panorama top view image generated by the apparatus for providing the top view image of the parking space in some forms of the present disclosure has a form in which a top view image 710 of a parking space that is provided in real time from the top view image generator 20 and previous top view images 721 and 722 captured by the controller 70 are connected.

The controller 70 may shade the captured previous top view images to increase visibility. For example, the controller 70 may apply 20% shading to the area 721 as a first step and may apply 50% shading to the area 722 as a second step. The number of areas to which shading is applied and the percentage of the shading may be varied depending on the designer's intention. The controller 70 may display the shaded panorama top view image on the navigation map.

Hereinafter, a process in which the controller 70 generates (synthesizes) a panorama top view image will be described in detail with reference to FIG. 8.

Figure 8:
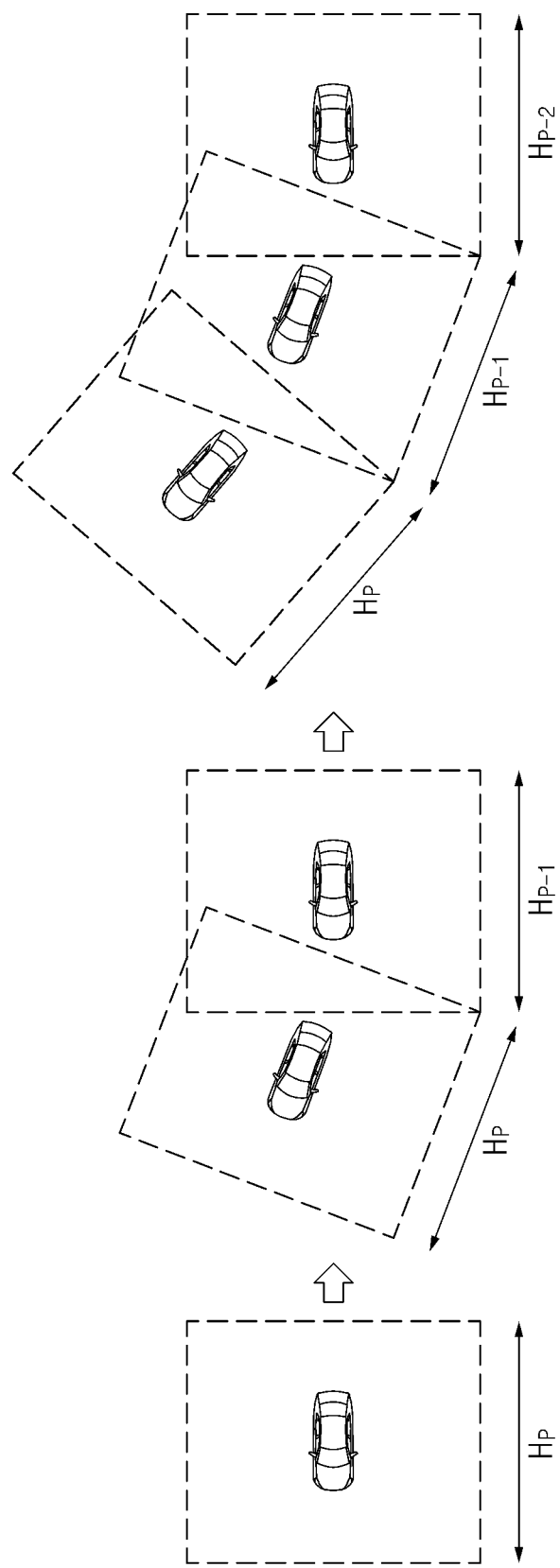
FIG. 8 is another exemplary view illustrating a process of generating a panorama top view image by the apparatus for providing the top view image of the parking space in one form of the present disclosure.

FIG. 8 is another exemplary view illustrating a process of generating a panorama top view image by the apparatus for providing the top view image of the parking space in some forms of the present disclosure.

As illustrated in FIG. 8, $H_p$ denotes the current top view image, $H_{p-1}$ denotes the previous top view image, and $H_{p-2}$ denotes the top view image right before $H_{p-1}$. The current top view image overlaps the previous top view image because the vehicle turns to the right.

Accordingly, the controller 70 may generate a panorama top view image by connecting the current top view image $H_p$ and the previous top view images $H_{p-1}$ and $H_{p-2}$, based on the steering angle measured by the steering angle sensor 60. At this time, the controller 70 may use the panorama image generation technology that is a well-known and common technology.

Figure 9:
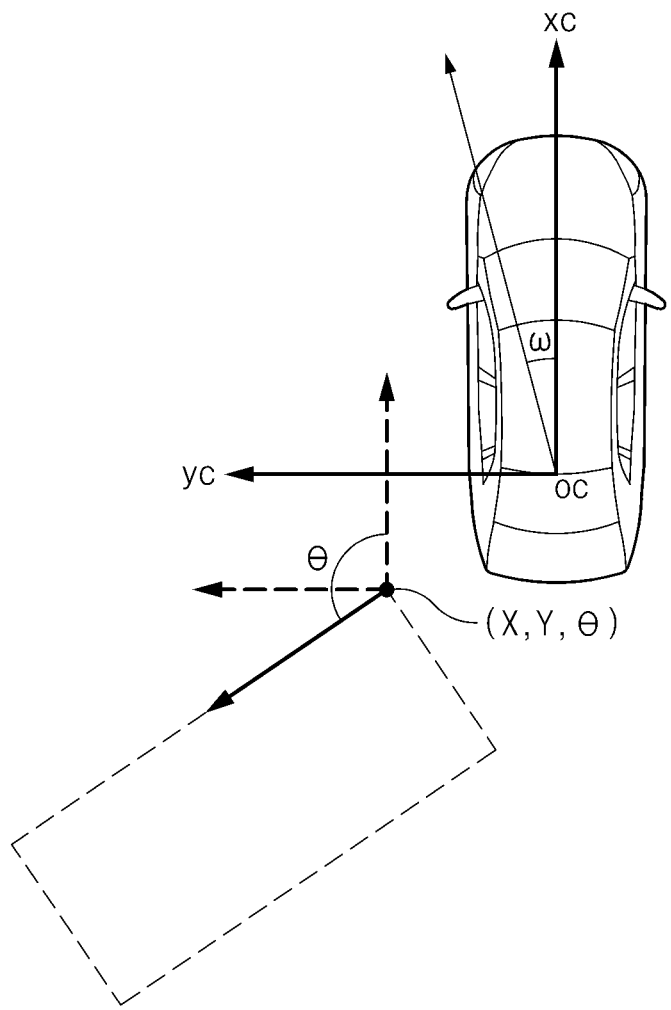
FIG. 9 is a view illustrating position information of an empty parking place represented by the apparatus for providing the top view image of the parking space in one form of the present disclosure.

FIG. 9 is a view illustrating position information of an empty parking place represented by the apparatus for providing the top view image of the parking space in some forms of the present disclosure.

In FIG. 9, xc denotes the longitudinal axis of a vehicle, yc denotes the lateral axis of the vehicle, oc denotes the center of the rear axle of the vehicle as a reference point (0, 0), θ denotes the angle (°) of an empty parking place from the xc axis, and ω denotes a steering angle.

Accordingly, the position coordinates of the empty parking place may be represented by (x, y, θ). In the case where the empty parking place is located on a left side of the vehicle, the position coordinates represent the position of the upper left corner of the empty parking place, and in the case where the empty parking place is located on a right side of the vehicle, the position coordinates represent the position of the upper right corner of the empty parking place. Furthermore, x is the x-coordinate based on the xc-yc axes, and the unit of the distance is centimeter (cm). y is the y-coordinate based on the xc-yc axes, and the unit of the distance is centimeter (cm). For example, when x is 50, it means that the empty parking place is spaced apart from the xc axis by 50 cm.

In addition, based on a movement around an empty parking place that is located on a rear side, a right side, or a left side of the vehicle and detected by the motion detection sensor 50, the controller 70 may control the display 30 to additionally display a warning icon 1001 on the empty parking place in a panorama top view image. At this time, the top view image displayed by the display 30 is as illustrated in FIGS. 10A and 10B.

Figure 10A:
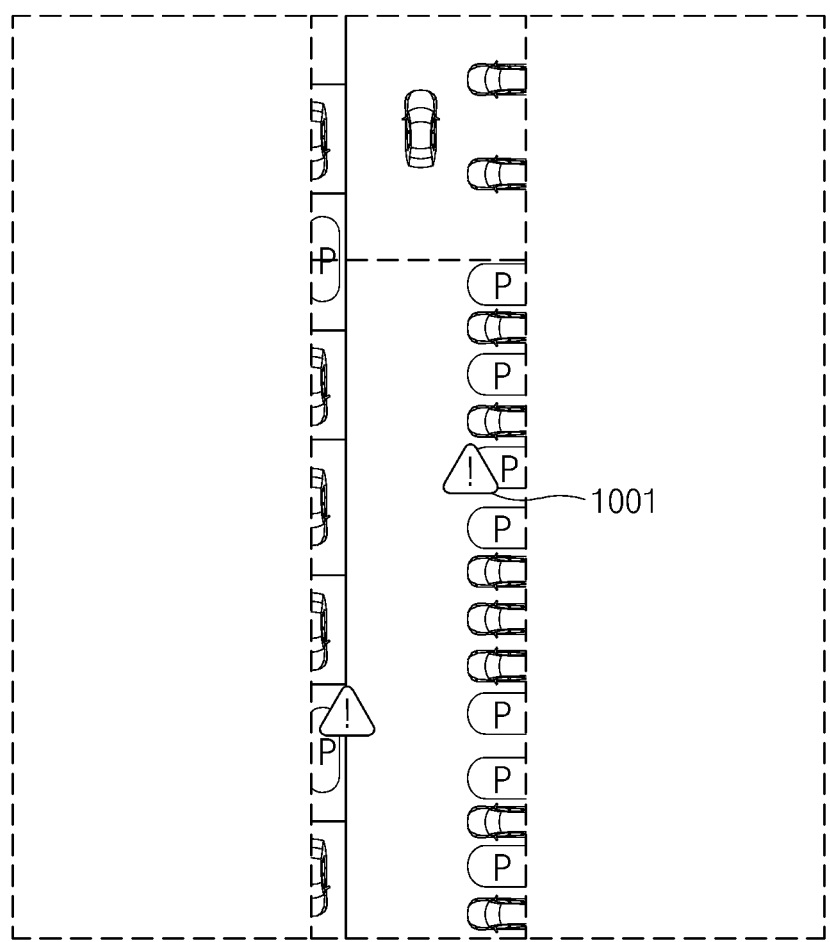
FIGS. 10A and 10B are views illustrating states in which the display of the apparatus for providing the top view image of the parking space displays a warning icon on a panorama top view image in one form of the present disclosure.
Figure 10B:
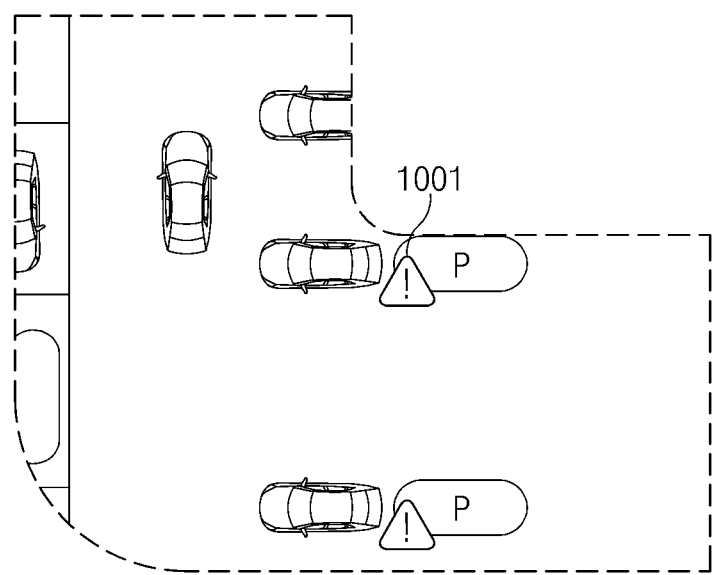

FIGS. 10A and 10B are views illustrating states in which the display of the apparatus for providing the top view image of the parking space displays a warning icon on a panorama top view image in some forms of the present disclosure.

As illustrated in FIGS. 10A and 10B, the areas represented by P on the panorama top view image are empty parking places, and when a movement is detected around a specific empty parking place, the controller 70 controls the display 30 to display the warning icon 1001 on the specific empty parking place.

The empty parking place having the warning icon 1001 displayed thereon is a space that a driver needs to identify, and before parking in the empty parking place on which the warning icon 1001 is displayed, the driver necessarily has to identify the empty parking place. When a parking path to the empty parking place having the warning icon 1001 displayed thereon is calculated, automatic parking may be performed, and when the parking path is not calculated, manual parking may be performed.

Figure 11:
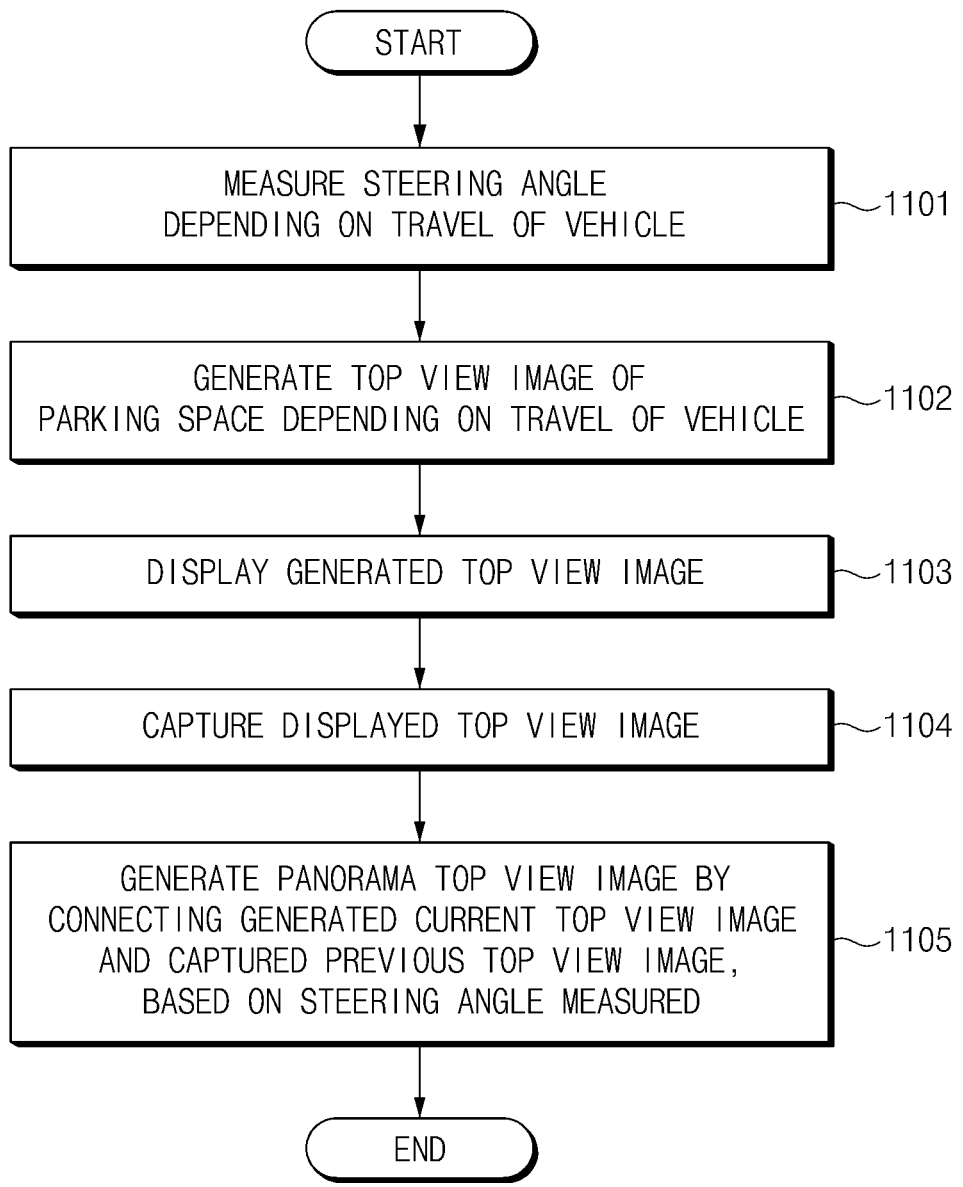
FIG. 11 is a flowchart illustrating a method for providing a top view image of a parking space in one form of the present disclosure.

FIG. 11 is a flowchart illustrating a method for providing a top view image of a parking space in some forms of the present disclosure.

The steering angle sensor 60 measures a steering angle depending on travel of a vehicle (1101).

The top view image generator 20 generates a top view image of a parking space depending on the travel of the vehicle (1102).

The display 30 displays the top view image generated by the top view image generator 20 (1103).

The controller 70 captures the top view image displayed by the display 30 (1104).

The controller 70 generates a panorama top view image by connecting the current top view image generated by the top view image generator 20 and the captured previous top view image, based on the steering angle measured by the steering angle sensor 60 (1105). At this time, the controller 70 may apply shading to the captured top view image of the panorama top view image. That is, the controller 70 may divide the captured top view image into a plurality of areas and may differently shade the plurality of areas.

For example, the controller 70 may apply 20% shading to the captured previous top view image as a first step when the steering angle is less than 30 degrees and the distance from the vehicle is less than 10 m, may apply 50% shading to the captured previous top view image as a second step when the steering angle is 30 degrees or more and the distance from the vehicle is more than 10 m and less than 20 m, and may apply 80% shading to the captured previous top view image as a third step when the distance from the vehicle is 20 m or more. At this time, 100% shading represents black by which an object in an image is unable to be identified.

Figure 12:
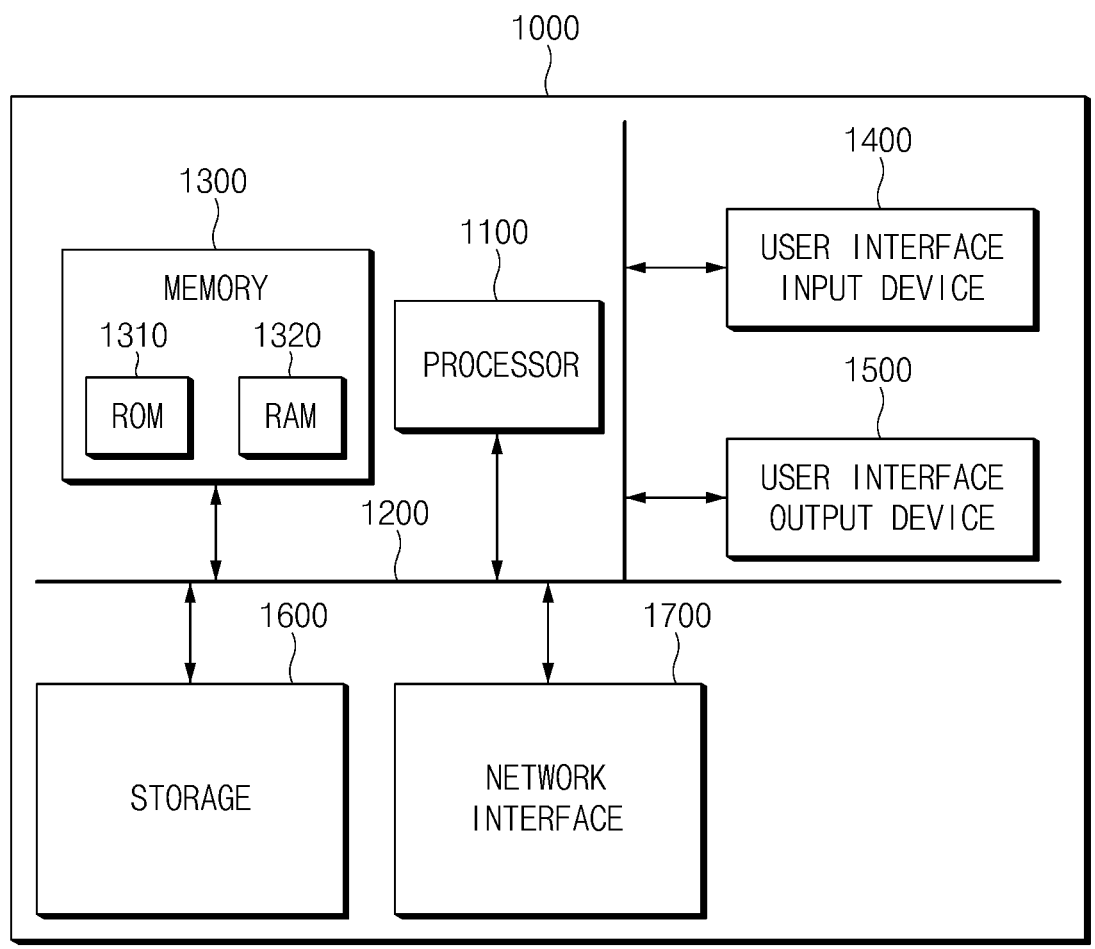
FIG. 12 is a block diagram illustrating a computing system for executing the method for providing the top view image of the parking space in one form of the present disclosure.

FIG. 12 is a block diagram illustrating a computing system for executing the method for providing the top view image of the parking space in some forms of the present disclosure.

Referring to FIG. 12, the method for providing the top view image of the parking space in some forms of the present disclosure may be implemented through the computing system. The computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in some forms of the present disclosure may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, or a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The apparatus and method for providing the top view image of the parking space in some forms of the present disclosure captures a top view image of a parking space on a path along which a vehicle travels, and provides a panorama top view image by connecting the current top view image and the previous top view image based on a steering angle depending on the travel of the vehicle, thereby enabling a user to freely select not only an empty parking place on the current top view image but also an empty parking place on the previous top view image.

Therefore, some forms of the present disclosure are provided to explain the spirit and scope of the present disclosure, but not to limit them, so that the spirit and scope of the present disclosure is not limited by some forms of the present disclosure. The scope of the present disclosure should be construed on the basis of the accompanying claims, and all the technical ideas within the scope equivalent to the claims should be included in the scope of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An apparatus for providing a top view image of a parking space, the apparatus comprising:
    a steering angle sensor configured to measure a steering angle of a vehicle;
    a display configured to display the top view image of the parking space depending on travel of the vehicle;
    a processor; and
    a non-transitory storage medium containing program instructions that, when executed by the processor, causes the apparatus to:
    capture the top view image; and
    generate a panorama top view image by connecting the displayed top view image and the captured top view image based on the measured steering angle,
    wherein the program instructions when executed are configured to remove an area of overlap between the displayed top view image and the captured top view image caused by the steering angle,
    wherein the program instructions when executed are configured to apply a first shading to a captured previous top view image when the steering angle is less than predetermined degrees and a distance from the vehicle is less than a first predetermined distance, apply a second shading to the captured previous top view image when the steering angle is more than the predetermined degrees and the distance from the vehicle is more than the first predetermined distance.

2. The apparatus of claim 1, wherein the program instructions when executed are configured to control the display to display the generated panorama top view image.

3. The apparatus of claim 2, wherein the apparatus further comprises:
    a motion detection sensor configured to detect a movement around an empty parking place.

4. The apparatus of claim 3, wherein the program instructions when executed are configured to control the display to additionally display a warning icon at a position on the panorama top view image that corresponds to the empty parking place around which the movement is detected by the motion detection sensor.

5. The apparatus of claim 1, wherein the program instructions when executed are configured to store the captured top view image in storage.

6. The apparatus of claim 5, wherein the program instructions when executed are configured to delete the stored top view image when a lifetime of the stored top view image exceeds a predetermined amount of time.

7. The apparatus of claim 5, wherein the program instructions when executed are to delete the stored top view image when the vehicle travels a second predetermined distance.

8. A method for providing a top view image of a parking space, the method comprising:
    measuring, by a steering angle sensor, a steering angle depending on travel of a vehicle;
    generating, by a top view image generator, the top view image of the parking space depending on travel of the vehicle;
    displaying, by a display, the generated top view image;
    capturing, by a controller, the top view image; and
    generating, by the controller, a panorama top view image by connecting the generated top view image and the captured top view image based on the measured steering angle,
    wherein the generating of the panorama top view image includes:
        removing an area of overlap between the generated top view image and the captured top view image caused by the steering angle,
        applying a first shading to a captured previous top view image when the steering angle is less than predetermined degrees and a distance from the vehicle is less than a first predetermined distance; and
        applying a second shading to the captured previous top view image when the steering angle is more than the predetermined degrees and the distance from the vehicle is more than the first predetermined distance.

9. The method of claim 8, wherein the method further comprises:
    displaying, by the display, the generated panorama top view image.

10. The method of claim 9, wherein the method further comprises:
    detecting, by a motion detection sensor, a movement around an empty parking place; and
    displaying, by the display, a warning icon at a position on the panorama top view image that corresponds to the empty parking place around which the movement is detected.

11. The method of claim 8, wherein the method further comprises:
    storing, by a storage, the captured top view image; and
    deleting, by the controller, the stored top view image when a lifetime of the stored top view image exceeds a predetermined amount of time.

12. The method of claim 8, wherein the method further comprises:
    storing, by a storage, the captured top view image; and
    deleting, by the controller, the stored top view image when the vehicle travels a second predetermined distance.

* * * * *